United States Patent [19]

Wainerdi

[11] Patent Number: 4,657,651
[45] Date of Patent: Apr. 14, 1987

[54] VERTICAL GAS ELECTRODE OPERATION

[75] Inventor: Thomas J. Wainerdi, Lake Jackson, Tex.

[73] Assignee: The Dow Chemical Company, Midland, Mich.

[21] Appl. No.: 848,098

[22] Filed: Apr. 4, 1986

[51] Int. Cl.[4] .......................... C25B 9/00; C25B 11/03; C25B 11/12

[52] U.S. Cl. .................................... 204/265; 204/266; 204/277; 204/278; 204/283; 204/284; 204/294; 429/25

[58] Field of Search ............... 204/256, 258, 265, 266, 204/270, 277, 278, 294, 283–284, 129; 429/25

[56] References Cited

U.S. PATENT DOCUMENTS

| | | | |
|---|---|---|---|
| 3,220,937 | 11/1965 | Friese et al. | 204/277 X |
| 3,432,404 | 3/1969 | Erdös et al. | 204/278 X |
| 3,527,690 | 9/1970 | DuBellay et al. | 204/284 |
| 3,592,749 | 7/1971 | Grangaard | 204/265 X |
| 3,945,892 | 3/1976 | James et al. | 204/257 X |
| 4,042,481 | 8/1977 | Kelly | 204/278 X |
| 4,260,469 | 4/1981 | McIntyre et al. | 204/265 |
| 4,528,251 | 7/1985 | Yamaguchi et al. | 429/25 |
| 4,539,086 | 9/1985 | Fujita et al. | 204/283 X |

*Primary Examiner*—Donald R. Valentine

[57] ABSTRACT

An apparatus, used in operation of electrolytic cells, to balance the interface pressure between liquid electrolyte and gas within the pores of a vertically disposed gas electrode. An electrode is sectioned into a plurality of lateral, or horizontal, gas compartments, vertically superposed, along one face of the electrode. The opposite face of the electrode is exposed to the liquid electrolyte. Each lateral compartment is supplied with gas. Each lateral compartment is also connected, via a separate gas line, to the bottom of a separate vertical chamber in a weir system. Each chamber has a vertical height equal to the depth of its respective cell compartment beneath the surface of the liquid electrolyte. The top of each weir chamber is provided with an overflow weir. Further, the chambers are arranged so that the overflow weir of each chamber flows into the next chamber, in order of decreasing vertical height. Gas is allowed to escape each lateral electrode compartment into a weir chamber. The weir chambers may be filled with the same type of liquid electrolyte that is contained in the cell. The gas will encounter the head pressure of the liquid contained in each chamber. Therefore, the gas will be back-pressured into each lateral electrode compartment at a pressure equal to the head pressure exerted by the liquid electrolyte in the cell at that compartment, thereby balancing the interface pressure.

25 Claims, 1 Drawing Figure

VERTICAL GAS ELECTRODE OPERATION

BACKGROUND OF THE INVENTION

In the operation of certain types of electrolytic cells, including fuel cells, it is advantageous to balance the pressure between a gas and a liquid within the pores of a porous gas electrode. By balancing the pressure between gas and liquid, the contact between gas and liquid is restricted to within the pores of the electrode where a three phase reaction between the electrolyte, the gas, and the electrode can take place.

In the operation of electrolytic cells with vertically positioned gas electrodes, a problem exists in balancing the pressure of a gas with a liquid electrolyte. As is true of any liquid, the pressure exerted by the electrolyte against the containing surface of the cell increases as the depth of the liquid increases. In the case of a vertically positioned gas electrode, this liquid head pressure is exerted on the porous electrode and increases with increasing depth of the electrolyte.

In the operation of an industrial-size vertical electrode, the required balance of pressure between the liquid electrolyte and gas within the pores of the electrode generally takes place along the center section of the electrode. Gas sometimes escapes through the porous electrode by "bubbling out" at the top of the electrode, where the resisting head pressure of the liquid electrolyte is slight. Similarly, at the bottom of the electrode, the head pressure of the liquid is usually greater than the pressure of the gas, sometimes causing the electrode to flood in its lower sections.

The "bubbling out" of gas at the top of the electrode, and the flooding at the bottom of the electrode, both result in inefficient cell operation. It is, therefore, a general object of the present invention to provide a system for balancing a gas with a liquid electrolyte within the pores of an industrial sized, vertical gas electrode along the electrode's entire vertical length.

SUMMARY OF THE INVENTION

The present invention provides a system for balancing the pressure between a gas and a liquid electrolyte within the pores of an industrial sized, vertically positioned, gas electrode along the entire vertical length of the electrode. For the purposes of this invention, an industrial sized electrode will generally be considered to be an electrode between one and five feet tall; but it is understood that the invention may be applied to cells with electrodes that are substantially larger. In one embodiment of the present invention, a porous vertical electrode is sectioned into a series of laterally or horizontally disposed sections down its entire vertical length, resulting in a plurality of vertically superposed, horizontally disposed sections or compartments. Generally, it is anticipated that the compartments will each be approximately 2 to 24 inches thick. The thickness or depth of each compartment will be dependent upon the total height of the electrode and the type of electrode material, the liquid electrolyte, and the gas used. The width of the compartments should be large enough to insure adequate, even distribution of the gas. In practice it will be economically advantageous to reduce the width of the compartments as much as possible.

If a wall-type electrode is used, the electrode is to be sectioned into compartments on one face of the electrode. The unsectioned face of the electrode will be exposed to the liquid electrolyte, while the compartments formed by the horizontal sections on the opposing face will be separately supplied with a gas. If a cylindrical electrode is used, the interior of the electrode is sectioned into horizontal compartments and the exterior of the electrode is exposed to the liquid electrolyte. Similarly, if the exterior of the cylindrical electrode is sectioned into horizontal compartments the interior of the electrode is exposed to the liquid electrolyte.

In accordance with the present invention, a weir system is used to balance the pressure across a gas electrode. The system is composed of a number of vertical chambers, each being provided with an overflow weir. The number of vertical weir chambers matches the number of compartments created along the electrode. The weir chambers will be of varying height. The height of each weir chamber will be determined by the depth of its respective gas compartment in the liquid electrolyte. For example, if the bottom of an electrode section, or compartment, is located two feet from the surface of the electrolyte, a corresponding weir chamber filled with the same liquid will have a vertical height of two feet. In other words, the overflow weir for the chamber will be at a height of two feet. Likewise, if the bottom of a horizontal electrode compartment is located six feet down from the surface of the electrolyte, it will have a corresponding overflow weir at a height of six feet. For the purposes of this description, the height of a given weir chamber will be considered to be the same as the height of its overflow weir.

When designing the weir system, measurements are preferably taken from the bottom of each electrode compartment to the surface of the electrolyte in the cell in order to determine the heights of the corresponding weir chamber. It will be understood, however, that the measurements may, if desired, be taken from a point along the compartment which is generally in the lower half of the electrode compartment.

Once the electrode has been sectioned into horizontal compartments and a corresponding weir system has been built, a separate gas line will connect each compartment with a corresponding weir chamber. Each electrode compartment will then be connected to a source of gas. In operation, each chamber of the weir system will preferably be filled with the same type of liquid electrolyte that is used in the electrolytic cell. If a different liquid is used to fill the weir chambers, the weir chambers may have different heights than the weir chambers described above. If a different liquid is used, the heights of the weir chambers will depend upon the density of the liquid used.

Thus, if the liquid used has a density greater than the density of the electrolyte, the weir chambers will be shorter than the chambers described above, in inverse proportion to the densities of the two liquids. Allowing for such density differences, it may be said that each weir chamber should have generally the same effective height as the depth of its corresponding electrode compartment in the liquid electrolyte.

As the unsectioned surface of the vertical electrode is exposed to liquid electrolyte along its entire vertical length, gas will enter each horizontal electrode compartment through gas lines, or tubing, connected to a source of gas. The gas will be allowed to exit each compartment through additional gas lines, or tubing, which will connect the compartments to the weir chambers. The gas will encounter the head pressure of the liquid at the bottom of each weir chamber; thus, each horizontal electrode compartment will be back-pressured to a pressure equal to the head pressure of the liquid contained in its corresponding weir chamber.

The gas lines connecting the various electrode compartments to the weir chambers should also be connected to the bottom of each electrode compartment. In the operation of electrolytic cells, the gas may become humid due to its interface with the liquid electrolyte. As often occurs, this moisture may condense on the inner surfaces of the electrode compartments. In order to avoid flooding of the electrode compartments by this condensed moisture, the gas lines connecting the electrode compartments with the weir chambers should preferably exit the bottom of each compartment to allow the compartments to drain into the weir chambers. For this reason it is also important to construct the weir system so that the tallest weir chamber is at an elevation that is generally lower than the lowest electrode compartment.

Because each horizontal electrode compartment will be connected to a weir chamber whose height will equal the depth of the compartment below the surface of the liquid electrolyte, the gas will be back-pressured to a pressure equal to the head pressure exerted by the electrolyte on the electrode at the depth of that compartment. Thus, the pressure between gas and liquid will be substantially equalized within the pores of the porous electrode in each section of the electrode, and therefore along the entire vertical length of the electrode.

Fuel cells and other electrolytic cells usually have electrodes about one to five feet long. In applying the present invention to such electrodes, the compartments should have substantially equal thicknesses and may vary in thickness up to about twenty-four inches thick, preferably between about 9 and 15 inches thick.

DESCRIPTION OF DRAWING

The sole FIG. in the drawing is a schematic view of the gas electrode portion of an electrolytic cell, coupled with an assembly of weir chambers.

DETAILED DESCRIPTION

Figure 1:
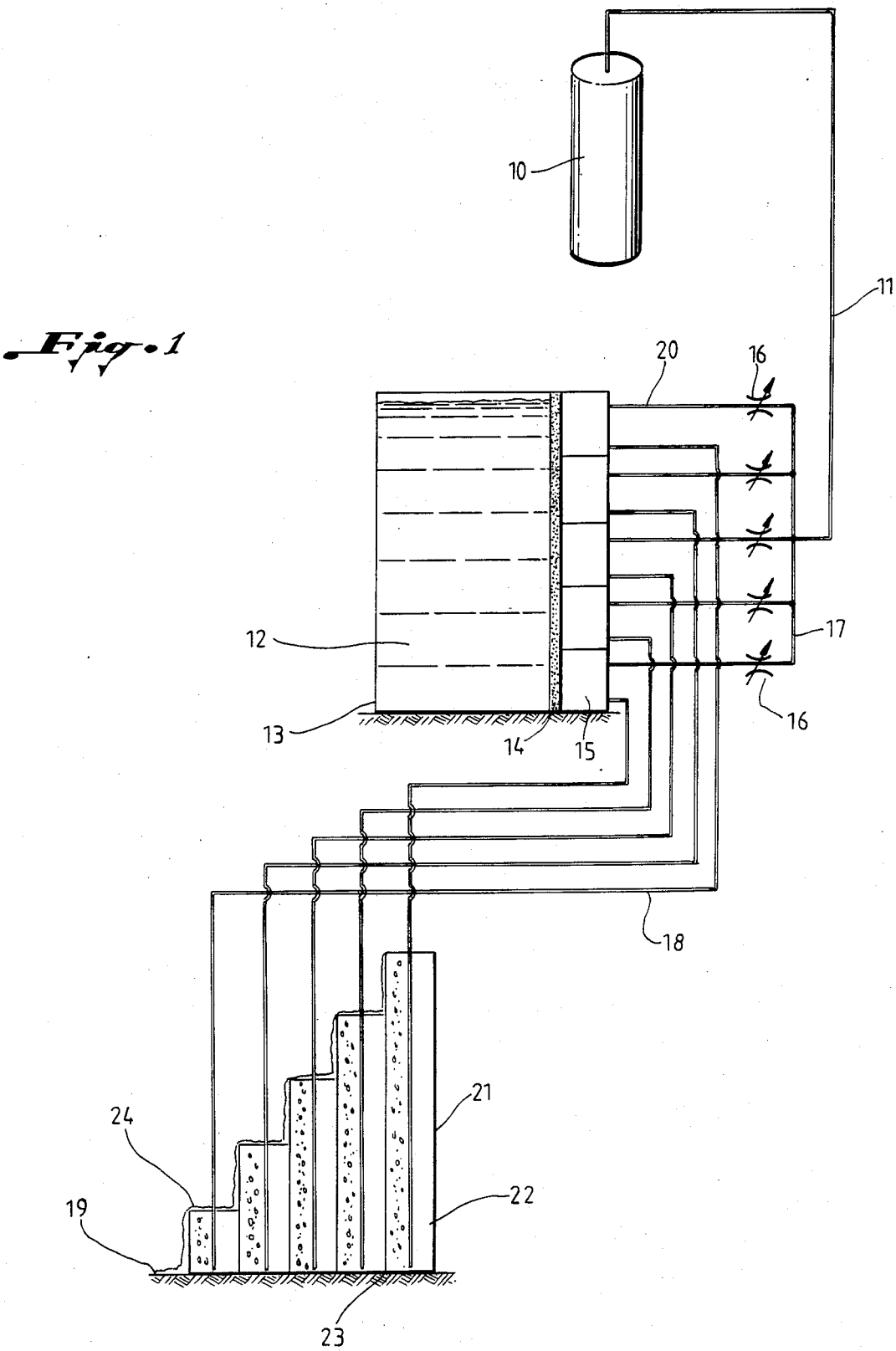

Referring to FIG. 1, a source of gas 10 is connected to a gas manifold 17 via a gas line 11. The gas used may be any type of gas that is typically used in an electrolytic cell, including fuel cell, operation. It may be, for example, a fuel gas used in a fuel cell, or it may be an oxidant gas used in a chlor-alkali cell.

A vertically positioned, porous gas electrode 14 is sectioned into horizontal compartments 15, and is exposed to liquid electrolyte 12.

In the actual operation of the disclosed apparatus, oxygen gas in conjunction with 80 g/l sodium hydroxide solution, and hydrogen gas in conjunction with 80 g/l hydrochloric acid solution, have been used successfully. In operating the disclosed apparatus with either of the above-mentioned gas-liquid combinations, a porous, woven carbon cloth electrode was used. The electrode used was purchased from the Prototech Company and contained colloidal Teflon and carbon impregnated into its fibers, the carbon contained up to 1.0 mg/cm$^2$ of platinum.

Gas manifold 17 connects gas line 11 to electrode sections 15. Each inlet gas line 20, connecting manifold 17 to a horizontal electrode section 15, contains a flow restricting means 16. The flow restricting means 16 restricts gas flow into the horizontal electrode compartments 15 in order to assure even distribution of gas into all the electrode compartments. In the absence of such flow restriction, gas supplied to the manifold 17 would encounter various different resisting pressures in different electrode compartments 15, due to the different head pressures exerted on each compartment 15, and would flood the compartments with the least resisting pressure, normally the uppermost compartments.

The flow restricting means 16 will normally restrict the flow of gas in varying degrees, depending upon the depths of the respective compartments 15. Thus, the flow restricting means 16 for a compartment 15 near the surface of the liquid electrolyte 12 will restrict the flow of gas to a greater degree than a flow restricting means 16 for a compartment 15 near the bottom of the electrolyte. Similarly, the pressure of the gas entering the horizontal electrode compartment 15 near the surface of the electrolyte 12 will be less than the pressure of the gas entering the horizontal electrode compartments 15 near the bottom of the cell 13, where the electrolyte 12 is deepest.

Each horizontal electrode section 15 is also connected via an outlet gas line, or tubing, 18 to a weir system 21. The weir system 21 is comprised of a plurality of vertical weir chambers 24. The weir chambers 24 will be of varying vertical height, and will normally be arranged in order of increasing vertical height as shown in FIG. 1. The weir system 21 is preferably built so that fluid from the weir chamber 24 with the greatest vertical height will overflow into the chamber 24 with the second greatest vertical height, and so on, until the weir chamber 24 with the least height overflows into a sump 19. The liquid gathered in sump 19 can then be treated, for example, to remove products or contaminants. The treated liquid may then be recharged if necessary and returned to the cell. Fresh liquid may also be added to the cell if necessary.

The weir system 21, as a whole, will be built at an elevation lower than the cell 13, in order to allow drainage from the electrode compartments to the weir system.

In a preferred embodiment of the invention, the liquid 22 contained in the various weir chambers 24 will be the same type of liquid electrolyte 12 that is contained in cell 13. The number of weir chambers 24 will also match exactly the number of horizontal electrode compartments 15. The effective heights of the various weir chambers 24 will correspond to the depths of their respective electrode compartments 15 beneath the surface of the liquid electrolyte 12 in the cell 13. One weir chamber 24 will correspond to one electrode compartment 15.

The horizontal electrode compartments 15 may vary in vertical thickness and will generally be between two and twelve inches thick. Thus, a compartment 15 that is twelve inches thick, measured from the surface of the electrolyte 12 to a depth twelve inches below the surface, will be connected via a gas line, or tubing, 18 to an electrolyte-filled weir chamber 24 having a vertical height of twelve inches. Similarly, the heights of the other weir chambers 24 may be determined by measuring the vertical distance from the surface of the electrolyte 12 to the bottom of their respective electrode compartments 15. As noted earlier, an operator may choose a vertical distance to a level somewhat above the bottom of each compartment, but generally in the lower half of the compartment.

In order to back-pressure the gas contained in any given electrode compartment 15 to a pressure equal to the head pressure exerted by the liquid electrolyte 12 against that same compartment, the gas line, or tubing, 18 connecting the compartment 15 will discharge into its corresponding weir chamber 24 substantially at the bottom 23 of such chamber. Also, in order to insure that the electrode compartments 15 do not become flooded with moisture condensed from humid gas, the gas lines 18 connecting the electrode compartments 15 with the weir chambers 24 should exit the bottom of each electrode compartment 15, thereby allowing the compartments 15 to drain into the weir chambers 24.

As explained earlier, the liquid contained in the weir system 22 need not be the same liquid 12 contained in the cell 13. If a different liquid 22 is used, the heights of the various weir chambers will be adapted to compensate for the difference in liquid density between the liquid contained in the weir system 22 and the liquid contained in the cell 12.

What is claimed is:

1. An apparatus for equalizing varying gas and liquid electrolyte interface pressures within the pores of a vertically positioned, porous gas electrode in an electrolytic cell, comprising:
   a porous, vertical gas electrode, sectioned into laterally disposed horizontal compartments down its vertical length and adapted to separate said cell into a gas zone and a liquid electrolyte zone, each said horizontal compartment being separately connectable to a source of gas; and
   a weir system comprising a plurality of vertical chambers each with an overflow weir, each said chamber being connected by a conduit to a separate one of said compartments, the weir of each chamber being at a height to provide a fluid head within its chamber to substantially balance the fluid head of said liquid electrolyte exerted on the said compartment to which said chamber is connected.

2. An apparatus, as set forth in claim 1, wherein said liquid electrolyte contained in said electrolytic cell is the same type of liquid contained in said weir system.

3. An apparatus, as recited in claim 1, wherein said vertical weir chambers have different vertical heights and are arranged in order of increasing vertical height so that the overflow of liquid from each given chamber, other than the shortest chamber, will flow into the next chamber in decreasing order of height.

4. An apparatus, as recited in claim 1, wherein said porous gas electrode is horizontally sectioned into compartments between one and twenty-four inches thick; said compartments being located on a face of said porous gas electrode which is laterally opposite to the face in contact with said liquid electrolyte.

5. An apparatus, as recited in claim 1, wherein the number of chambers in said weir system matches the number of horizontal compartments of said porous gas electrode.

6. An apparatus, as recited in claim 1, wherein said vertical chambers in said weir system are of varying vertical height, the vertical height of each given chamber equaling the depth of said compartment of said porous gas electrode to which said given chamber is connected from the surface of said liquid electrolyte in said cell.

7. An apparatus, as recited in claim 1, wherein each chamber of said weir system is connected by a conduit to a separate compartment of said porous gas electrode that has a vertical depth in said liquid electrolyte equal to the vertical height of the chamber.

8. An apparatus, as recited in claim 1, wherein a separate conduit connects each said chamber of said weir system to its respective horizontal compartment of said porous gas electrode; each said conduit connecting the bottom of its respective said weir chamber with the bottom of its respective said horizontal compartment.

9. An apparatus, as recited in claim 1, wherein each said horizontal compartment is connectable to a source of gas and each said compartment is connected by a separate conduit to a weir chamber.

10. An apparatus, as recited in claim 1, including a separate gas line connecting each said horizontal electrode compartment to a source of gas, and means in said line to restrict the flow of gas through said line.

11. An apparatus, as recited in claim 1, wherein said weir system is located at an elevation lower than the elevation of said horizontal compartment at the bottom of said cell.

12. An apparatus for equalizing varying oxygen gas and sodium hydroxide solution pressures within the pores of a porous, vertically positioned, woven carbon cloth electrode in an electrochemical cell, comprising:
   a porous, vertically positioned, woven carbon cloth electrode sectioned into vertically, superposed, horizontal compartments and adapted to separate said cell into a sodium hydroxide solution zone and an oxygen gas zone, each said horizontal compartment being separately connectable to a source of oxygen gas; and
   a weir system comprising a plurality of vertical chambers each with an overflow weir, each said chamber being connected by a conduit to a separate one of said horizontal compartments, the weir of each chamber being at a height to provide a fluid head within its chamber to substantially balance the fluid head of the sodium hydroxide solution exerted on the said compartment to which said chamber is connected.

13. An apparatus, as set forth in claim 12, wherein said sodium hydroxide solution is contained in both said weir system and in said electrochemical cell.

14. An apparatus, as set forth in claim 1, wherein said gas is hydrogen and said liquid electrolyte is hydrochloric acid.

15. An apparatus, as set forth in claim 1, wherein said porous gas electrode is a woven carbon cloth electrode impregnated with a mixture of colloidal Teflon and carbon.

16. An apparatus, as set forth in claim 12, wherein said woven carbon cloth electrode is impregnated with colloidal Teflon and carbon.

17. An apparatus, as recited in claim 12, wherein said vertical weir chambers have different vertical heights and are arranged in order of increasing vertical height so that the overflow of liquid from each given chamber, other than the shortest chamber, will flow into the next chamber in decreasing order of height.

18. An apparatus, as recited in claim 12, wherein said porous electrode is horizontally sectioned into compartments between one and twenty-four inches thick; said compartments being located on a face of said porous electrode which is laterally opposite to the face in contact with said sodium hydroxide solution.

19. An apparatus, as recited in claim 12, wherein the number of chambers in said weir system matches the number of horizontal compartments of said porous electrode.

20. An apparatus, as recited in claim 12, wherein said vertical chambers in said weir system are of varying vertical height, the vertical height of each given chamber equaling the depth of said compartment of said porous electrode to which said given chamber is connected from the surface of said sodium hydroxide solution in said cell.

21. An apparatus, as recited in claim 12, wherein each chamber of said weir system is connected by a conduit to a separate compartment of said porous electrode that has a vertical depth in said sodium hydroxide solution equal to the vertical height of said chamber.

22. An apparatus, as recited in claim 12, wherein a separate conduit connects each said chamber of said weir system to its respective compartment of said porous electrode; each said conduit connecting the bottom of its respective said weir chamber with the bottom of its respective compartment of said porous carbon cloth electrode.

23. An apparatus, as recited in claim 12, wherein each said horizontal compartment is connectable to a source of oxygen gas and each said compartment is connected by a separate conduit to a weir chamber.

24. An apparatus, as recited in claim 12, including a separate gas line connecting each said horizontal electrode compartment to a source of oxygen gas, and means in said line to restrict the flow of oxygen gas through said line.

25. An apparatus, as recited in claim 12, wherein said weir system is located at an elevation lower than the elevation of said horizontal compartment at the bottom of said cell.

* * * * *